(12) United States Patent
Altieri (10) Patent No.: US 12,555,986 B2
(45) Date of Patent: Feb. 17, 2026

(54) POWERED WIRE SKINNER (71) Applicant: Joseph Altieri, Goshen, NY (US)

(72) Inventor: Joseph Altieri, Goshen, NY (US)

(*) Notice: Subject to any disclaimer, the term of this patent is extended or adjusted under 35 U.S.C. 154(b) by 219 days.

(21) Appl. No.: 18/492,180

(22) Filed: Oct. 23, 2023

(65) Prior Publication Data
US 2024/0170933 A1 May 23, 2024

Related U.S. Application Data

(60) Provisional application No. 63/384,103, filed on Nov. 17, 2022.

(51) Int. Cl.
*H02G 1/12* (2006.01)

(52) U.S. Cl.
CPC ......... *H02G 1/1221* (2013.01); *H02G 1/1226* (2013.01)

(58) Field of Classification Search
None
See application file for complete search history.

(56) References Cited

U.S. PATENT DOCUMENTS

| | | | | | |
|---|---|---|---|---|---|
| 3,710,654 | A | * | 1/1973 | Halverson | H02G 1/1231 81/9.44 |
| 3,869,791 | A | * | 3/1975 | Horrocks | H02G 1/1226 30/90.1 |
| 9,929,548 | B2 | * | 3/2018 | Troy | H02G 1/1226 |
| 2018/0166867 | A1 | * | 6/2018 | Troy | B26D 7/26 |
| 2024/0170933 | A1 | * | 5/2024 | Altieri | H02G 1/1226 |

FOREIGN PATENT DOCUMENTS

KR 20170089733 A * 8/2017 ........... H02G 1/1231

OTHER PUBLICATIONS

English translation of KR-20170089733-A, dated Aug. 4, 2017.*

* cited by examiner

*Primary Examiner* — Hwei-Siu C Payer
(74) *Attorney, Agent, or Firm* — Tatonetti IP (57) ABSTRACT

A powered wire skinner is configured with a skinner assembly that circumferentially attaches to a wire and a drive assembly that engages with a gear on the skinner to cause a portion of the skinner to rotate about the wire while cutting its exterior skin. The drive includes a drive shaft that engages with an electric drill's chuck. The rotation of the electric drill at the drive shaft translates to the rotational movement of the skinner assembly, thereby cutting the wire's skin to ultimately remove a portion of the wire's skin and expose the wire's metallic portion. The skinner's blade is spring-loaded to cause downward pressure against any surface that engages with the wire, namely the wire's skin. Thus, the rotational movement initiated by the power drill causes the spring-loaded blade to cut the skin and ultimately remove a desired portion of it.

20 Claims, 8 Drawing Sheets

POWERED WIRE SKINNER

CROSS-REFERENCES TO RELATED APPLICATIONS

This Non-Provisional Utility Patent application claims the benefit of and priority to U.S. Provisional Application Ser. No. 63/384,103, filed Nov. 17, 2022, entitled "Battery-Driven Spacer Wire Skinner," the entire contents of which is hereby incorporated herein by reference.

BACKGROUND

Linemen working on electrical wires, such as those secured to telephone poles, occasionally need to remove the relatively tough skin surrounding the metallic wire. Linemen may use battery skinners typically configured to only skin the end of a wire, which is not always the most convenient way for linemen to achieve their goal if, for example, they are focusing on the middle section of a wire.

SUMMARY

A powered wire skinner is configured with a stripper assembly (hereinafter referred to as a "stripper assembly" or "stripper") that circumferentially attaches to a wire and a drive assembly (hereinafter referred to as a "drive" or "drive assembly") that engages with a gear on the skinner to cause a portion of the skinner to rotate about the wire while cutting its exterior skin. The drive includes a drive shaft that engages with an electric drill's chuck. The rotation of the electric drill at the drive shaft translates to the rotational movement of the skinner assembly, thereby cutting the wire's skin to ultimately remove a portion of the wire's skin and expose the wire's metallic portion. The stripper's blade is spring-loaded to cause downward pressure against any surface that engages with the wire, namely the wire's skin. Thus, the rotational movement initiated by the power drill causes the spring-loaded blade to cut the skin and ultimately remove a desired portion of it.

The stripper assembly includes a worm gear positioned adjacent to bearings and a tube that receives the wire. The stripper, including the worm gear, bearings, tube, and the hinge frame, props open such that the worm gear, bearings, and tube are partial components that connect when closed. This enables the entire stripper to open and be positioned over any portion of a wire, even the middle. The drive assembly includes a base and a closure that secures to the stripper's worm gear. The base and closure have a cutout that at least partially receives the worm gear. The base includes a worm shaft inside its cutout that engages with the worm gear's teeth. The worm shaft is directly or indirectly connected to the worm shaft such that rotational movement at the drive shaft, such as via a connected power drill, translates to the worm shaft. The rotational movement at the worm shaft then causes the corresponding movement at the worm gear, which ultimately causes the entire stripper assembly to rotate. When the stripper is propped on a wire, the stripper's spring-loaded blade engages with and cuts the wire's exterior skin to ultimately remove a portion of the skin and expose the insulated metallic portion.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. These and various other features will be apparent from a reading of the following Detailed Description and a review of the associated drawings.

BRIEF DESCRIPTION OF THE DRAWINGS

Like reference numerals indicate like elements in the drawings. Elements are not drawn to scale unless otherwise indicated.

DETAILED DESCRIPTION

Figure 1:
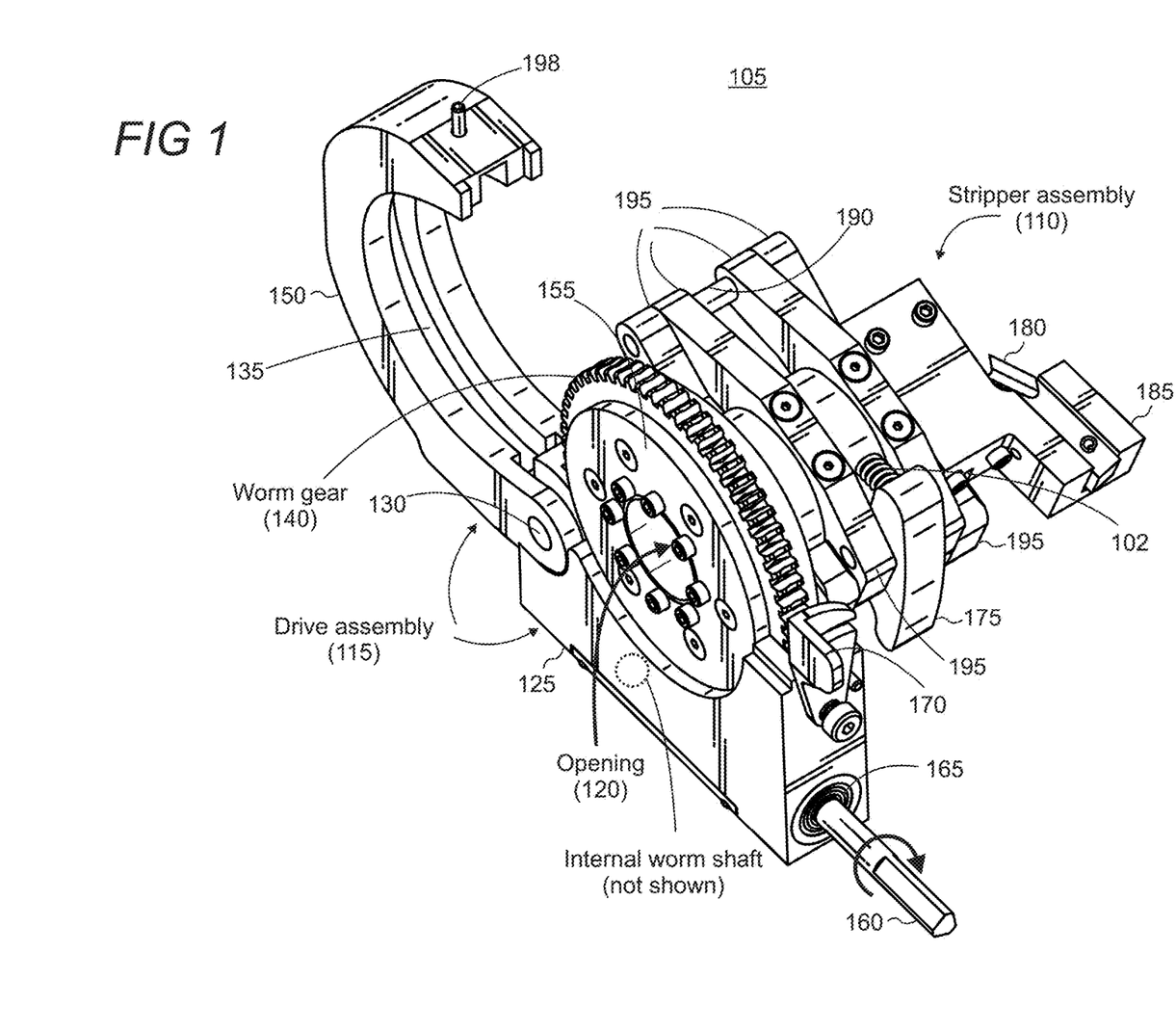
FIG. 1 shows an illustrative representation of the wire skinner having a stripper assembly and a drive assembly.

FIG. 1 shows an illustrative representation of a powered wire skinner 105 comprised of a stripper assembly 110 (hereinafter referred to as "stripper assembly" or "stripper") and a drive assembly 115 (hereinafter referred to as "drive assembly" or "drive") that interact with each other. The stripper assembly is the portion of the wire skinner that strips the wire's or cable's exterior protective skin from the wire's metallic portion, such as aluminum, copper, etc. A wire's exterior skin or insulation may be, for example, plastic, polyethylene, etc., but other materials are also possible. Although the present disclosure is directed to linemen accessing electrical wires on telephone poles, the present implementation may be adapted for uses with other types of wires or cables, such that the skinner assembly 105 may be adapted in a variety of sizes to accommodate different wires.

The stripper 110 includes an opening 120 that fully extends through its body in order to prop the stripper assembly on a wire. The stripper has a hinge frame 195 with a pin 190, about which the hinge frame rotatably opens and closes. Thus, the arms of the hinge frame that connect to the pin 190 operate as a hinge to enable the opening and closing of the stripper. The latch 175 on a side opposite the pin 190 grasps against another pin, not shown in FIG. 1. When a user unlocks the latch, the stripper assembly fully opens, enabling the user to place the stripper on the wire within the stripper's opening 120.

The worm gear 140 is comprised of two halves that also prop open when the hinge frame 195 is opened about the pin 190. The worm gear has bearings 155 on each side to support and guide the rotational movement of the worm gear, thereby reducing friction and wear and tear on the components. The worm gear rotates responsive to the rotational movement of the drive shaft or bit 160 connected to the internal worm shaft (not shown in FIG. 1). Thus, when a user connects a power drill to the drive shaft 160, the powered rotational movement translates from the drive shaft to the worm shaft, directly engaging with the stripper's worm gear 140 to effectuate movement. Bearings 165 are also positioned at the point of engagement of the drive shaft to help reduce friction and provide support. The stripper assembly includes a blade holder 185 to which a blade 180 removably attaches. The blade is spring-loaded inside the holder to apply sufficient pressure against and cut a wire's exterior insulation.

In typical implementations, the drive assembly 115 is a distinct component of the stripper assembly 110. Thus, the user first props the stripper assembly on a wire, and then attaches the drive to the stripper. The drive is in an opened position in FIG. 1 and includes a base portion 125 and a closure 150 that connects to the base. The closure rotates about the pin 130, which connects the closure to the base, thereby operating as a hinge. The base and closure have a cutout 135 to accommodate and receive the worm gear 140. Once the worm gear is placed inside the cutout on the base 125, the worm gear's teeth engage with the worm shaft's threads. The drive's closure includes a latch pin 198 that engages with the drive's latch 170 when in a closed position. Once closed, the drive assembly includes an empty center at least the same size or larger than the opening 120 so that the drive does not interfere with the cable. The spring 102 is present to allow the user to pull back the latch 170 and detach it from the pin.

Figure 2:
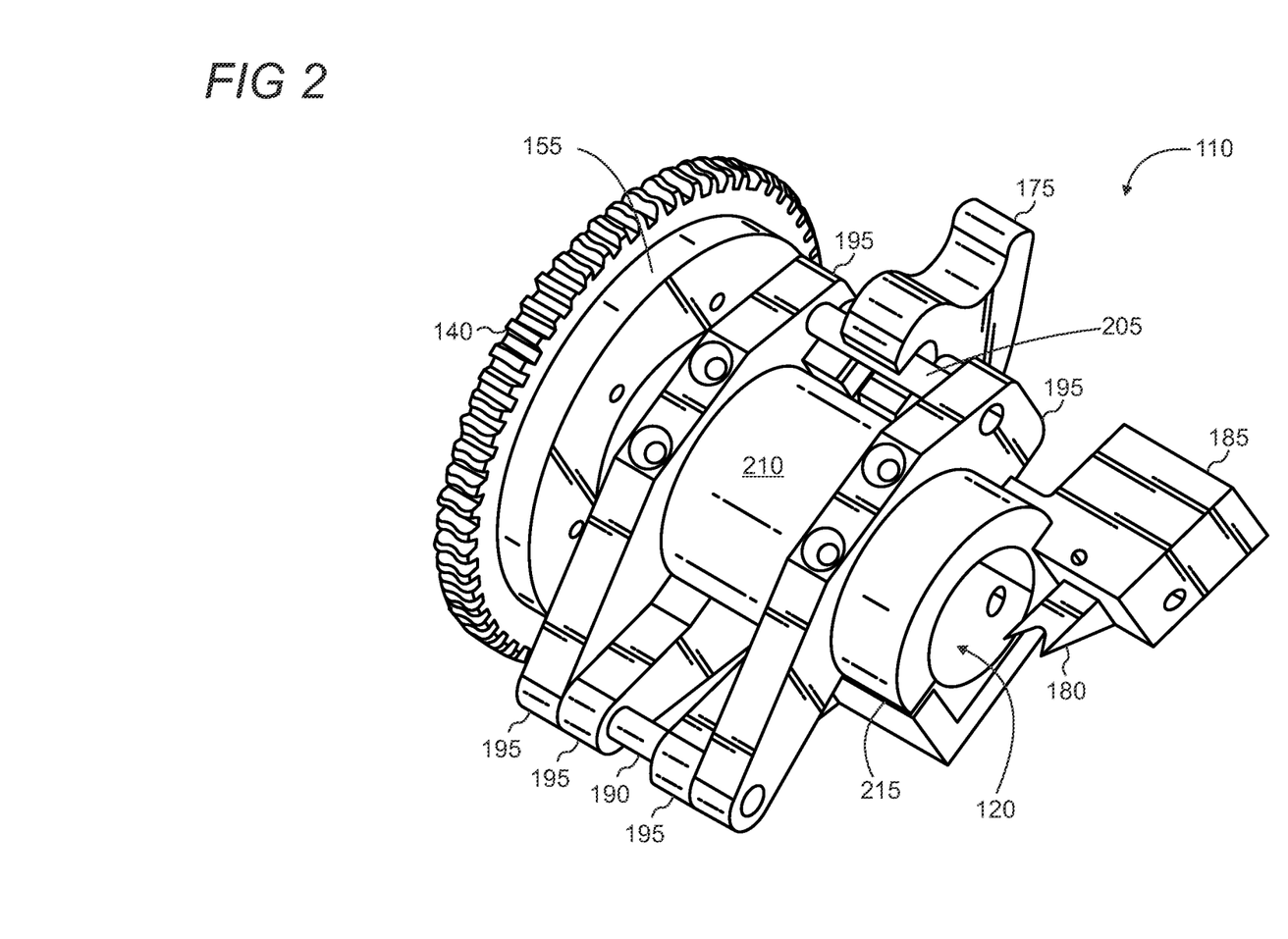
FIG. 2 shows an illustrative representation of the stripper assembly's blade overlapping with an opening therein.

FIG. 2 shows an illustrative representation in which the opposite side of the stripper assembly 110 is shown. The blade 180 at least partially overlaps with the opening 120 so that it can cut into the wire's skin during rotational movement. FIG. 2 also shows the latch 175 engaging with pin 205 positioned on the opposite side of the pin 190. Each pin 205 and 190 are secured and connected to the hinge frame 195. More clearly shown in FIG. 2 is the tube 210 on the stripper assembly, which encompasses a wire. Furthermore, the separation 215 between the distinct halves of the stripper assembly allows the stripper to be propped open and positioned over any location of a wire so that a user can strip any portion of the wire from end to end, namely a middle section.

Figure 3:
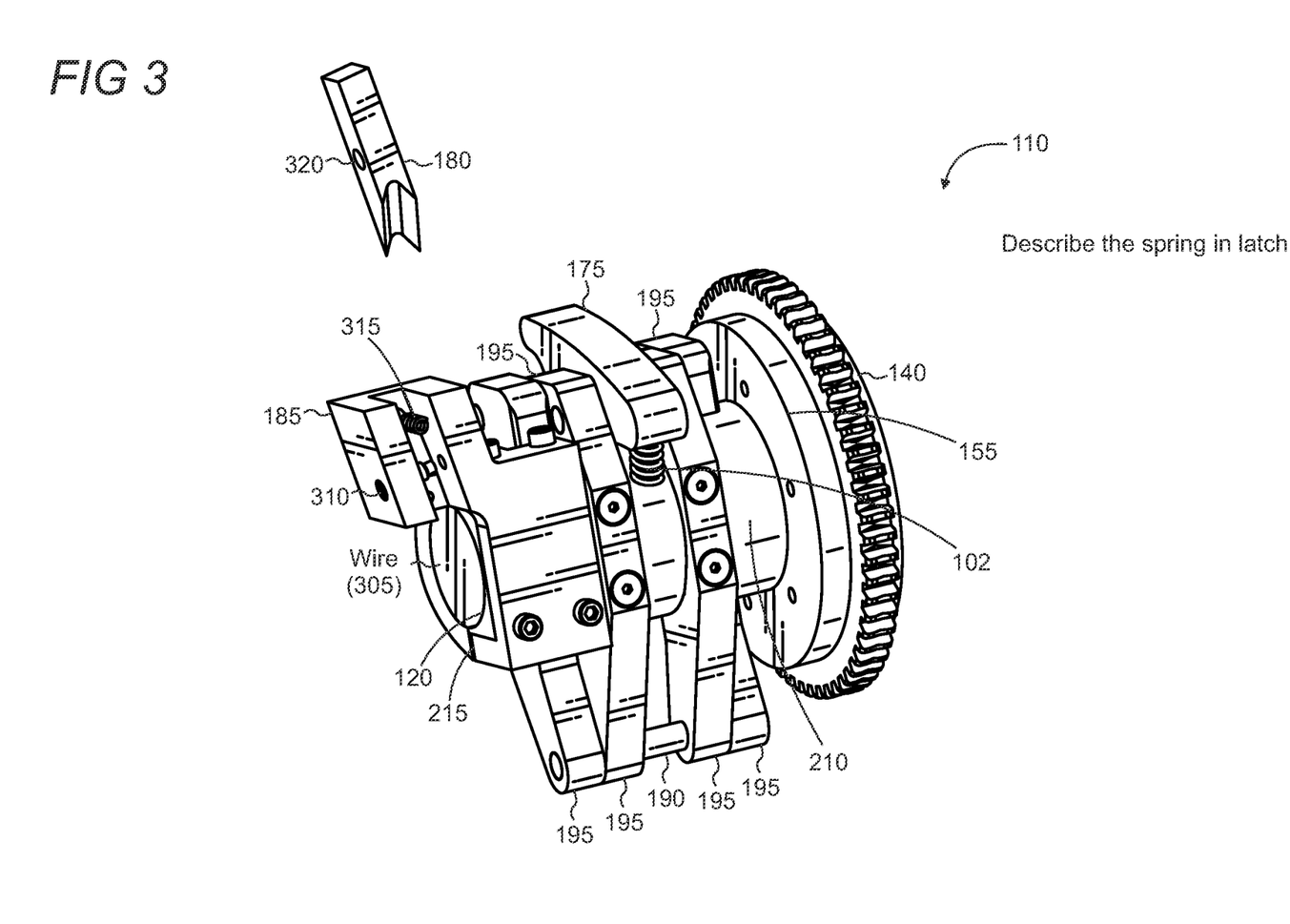
FIG. 3 shows an illustrative representation of the blade removed from the blade holder on the stripper assembly.

FIG. 3 shows an illustrative representation in which the blade 180 is removed from the blade holder 185. As shown, the blade holder includes a spring 315 that causes outward pressure against the blade and, thereby, against a wire when inserted into the opening 120. The blade holder includes a screw or bolt 310 that extends through the blade holder into a corresponding hole 320 on the blade 180 to secure the components together. In this regard, blades can be periodically changed once their sharpness dulls.

Figure 4:
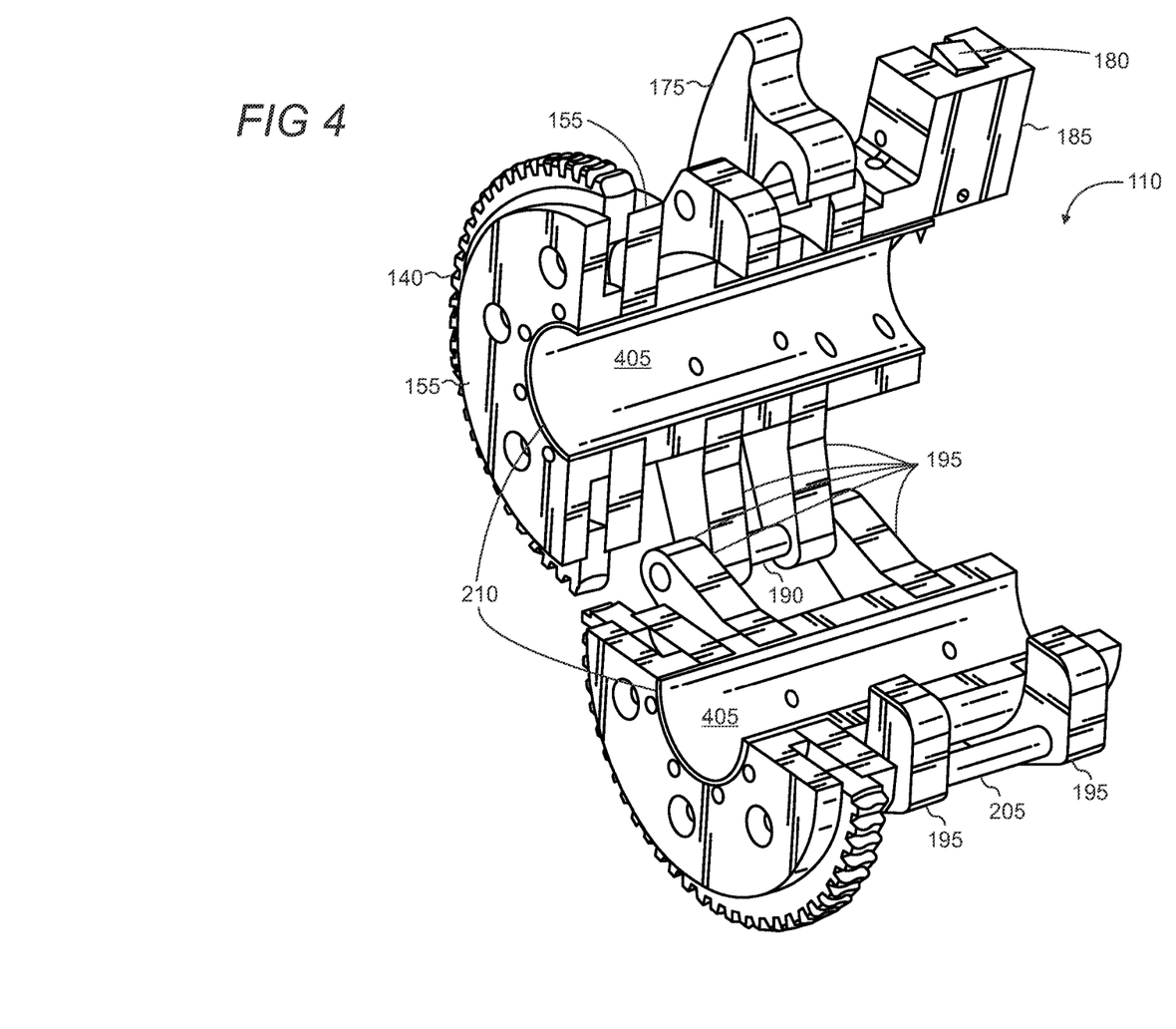
FIG. 4 shows an illustrative representation of the stripper assembly in an opened position to position it over a cable wire.

FIG. 4 shows an illustrative representation in which the stripper 110 is propped open to enable users to place it over a wire. As shown, virtually the entire stripper assembly comprises halves that combine when closed, including the worm gear 140, the bearings 155, the hinge frame 195, and the tube 210 and associated opening 120. The tube's interior surface 405 is exposed and is designed to fit, for example, a cable wire. In other implementations, the tube may have different sizes to accommodate different types and wires. Once the stripper is positioned on a wire (i.e., the wire is on one of the surface 405), the user can close the stripper and securely attach the halves together by clasping the latch 175 against the pin 205.

Figure 5:
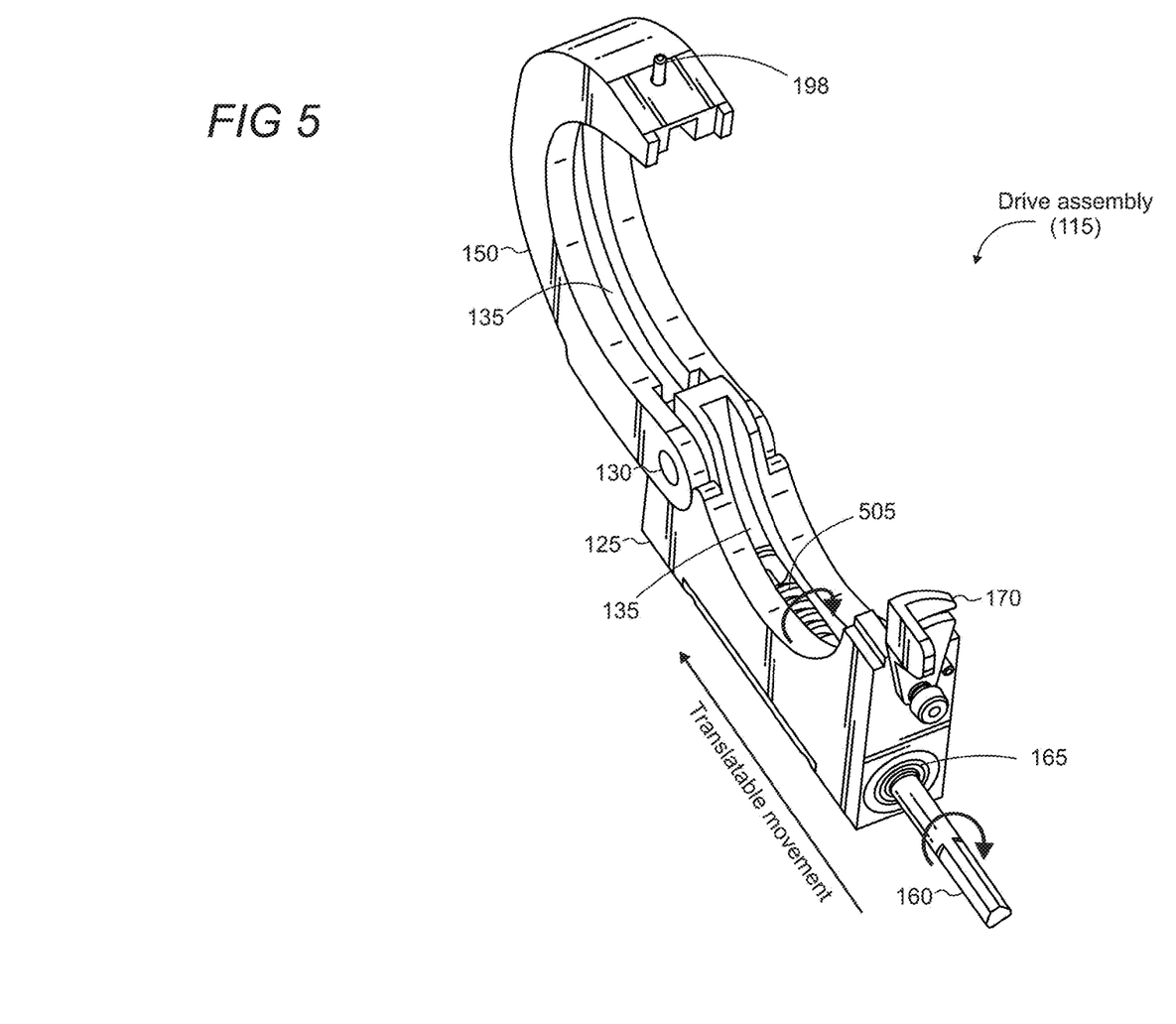
FIG. 5 shows an illustrative representation of the drive assembly in an open position.

FIG. 5 shows an illustrative representation in which the drive assembly 115 is in an opened position, and the worm shaft 505 is exposed within the cutout 135. The worm shaft includes threads or ridges that correspondingly engage with the worm gear's teeth on the stripper 110. Once the stripper is secured over a wire and in a closed position (FIG. 3), the user props the drive over the stripper such that the worm gear enters the base's opening 135 and engages with the worm shaft. Once the worm gear and shaft are properly engaged, the user can shut the closure 150 and secure it in place using the latch 170 and pin 198. Subsequently, the user can attach a drill or other power source to the drive shaft 160. The rotational operation of the drill translates to the drive shaft, which is connected to the worm shaft 505. Rotational movement of the worm shaft travels to the worm gear, which ultimately causes the entire stripper assembly 110 to rotate about the wire.

Figure 6:
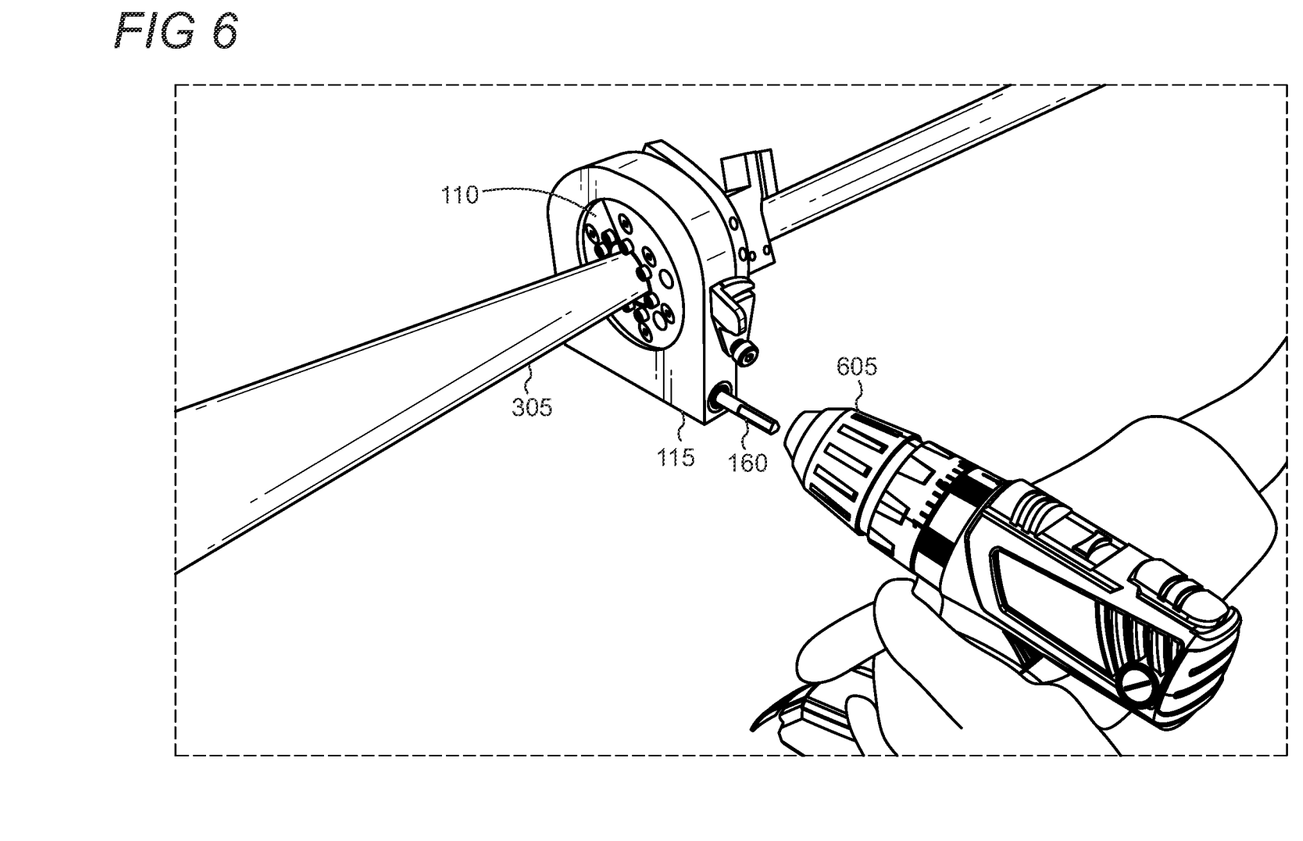
FIG. 6 shows an illustrative representation of the entire wire skinner positioned on a cable wire and in a closed position.
Figure 7:
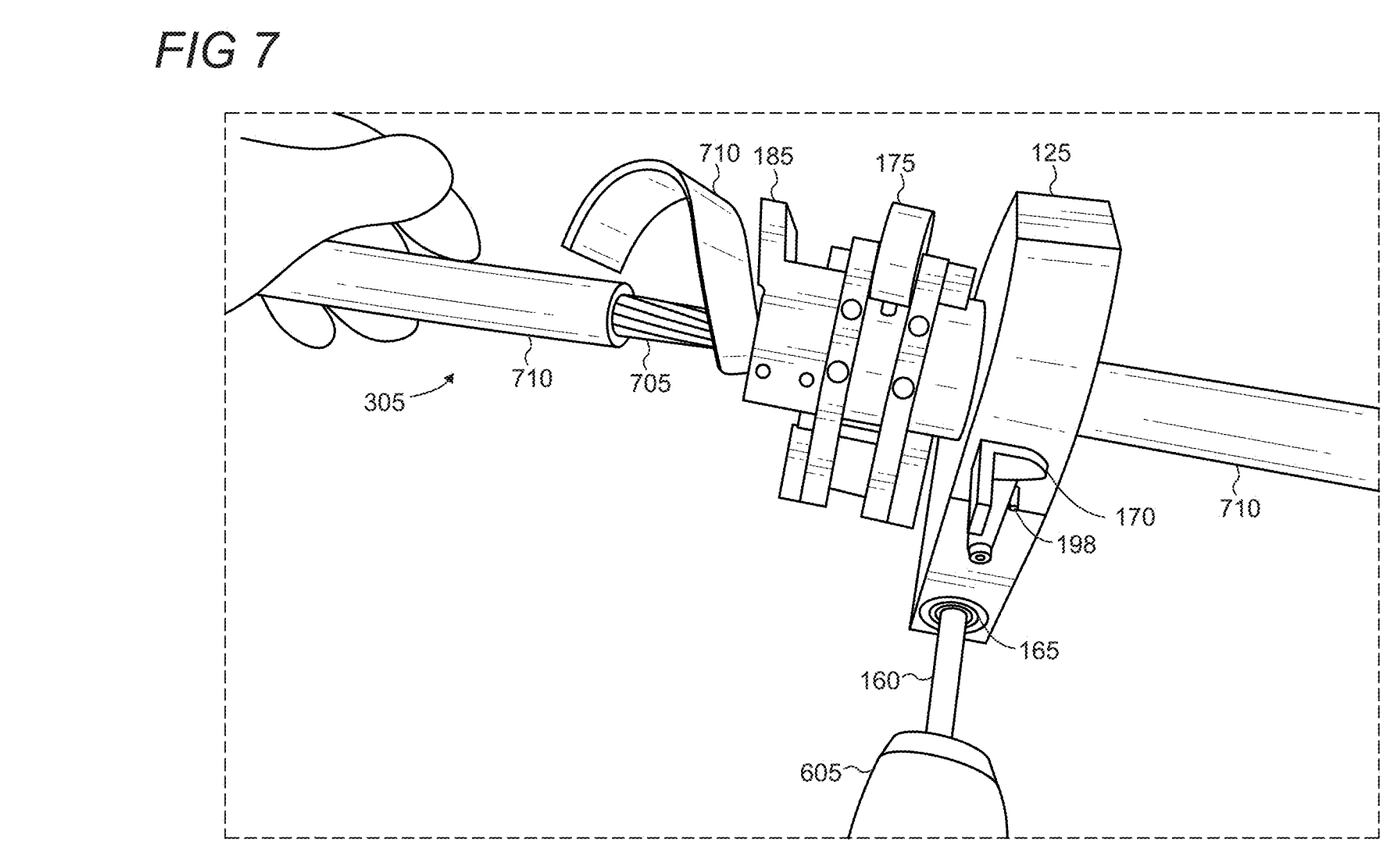
FIG. 7 shows an illustrative representation of the wire's skin being peeled away from the wire skinner's operation.

FIGS. 6 and 7 show illustrative representations in which the entire skinner assembly 105, comprised of the stripper 110 and drive 115, are fully placed around a wire 305. The user attaches the drive shaft 160 to the drill's chuck 605 and pulls the trigger to initiate the rotational movement. The rotational movement of the drive shaft 160 translates to the worm shaft 505 (FIG. 5), as the drive shaft and worm shaft are connected to each other, either directly or indirectly. The worm shaft and drive shaft may be comprised of the same unitary piece or may be two or more distinct pieces that are connected to each other, such as welded together or connected via an adapter. As the worm shaft rotates, its threads, which are engaged with the worm gear's teeth, cause the worm gear to move correspondingly. As the worm gear 140 is attached to and forms a unitary structure with the stripper assembly 110, its rotation causes the entire stripper to rotate about the wire 305 while the drive assembly 110 maintains its static position with the exception of the drive shaft 160 and worm shaft 505.

Figure 8:
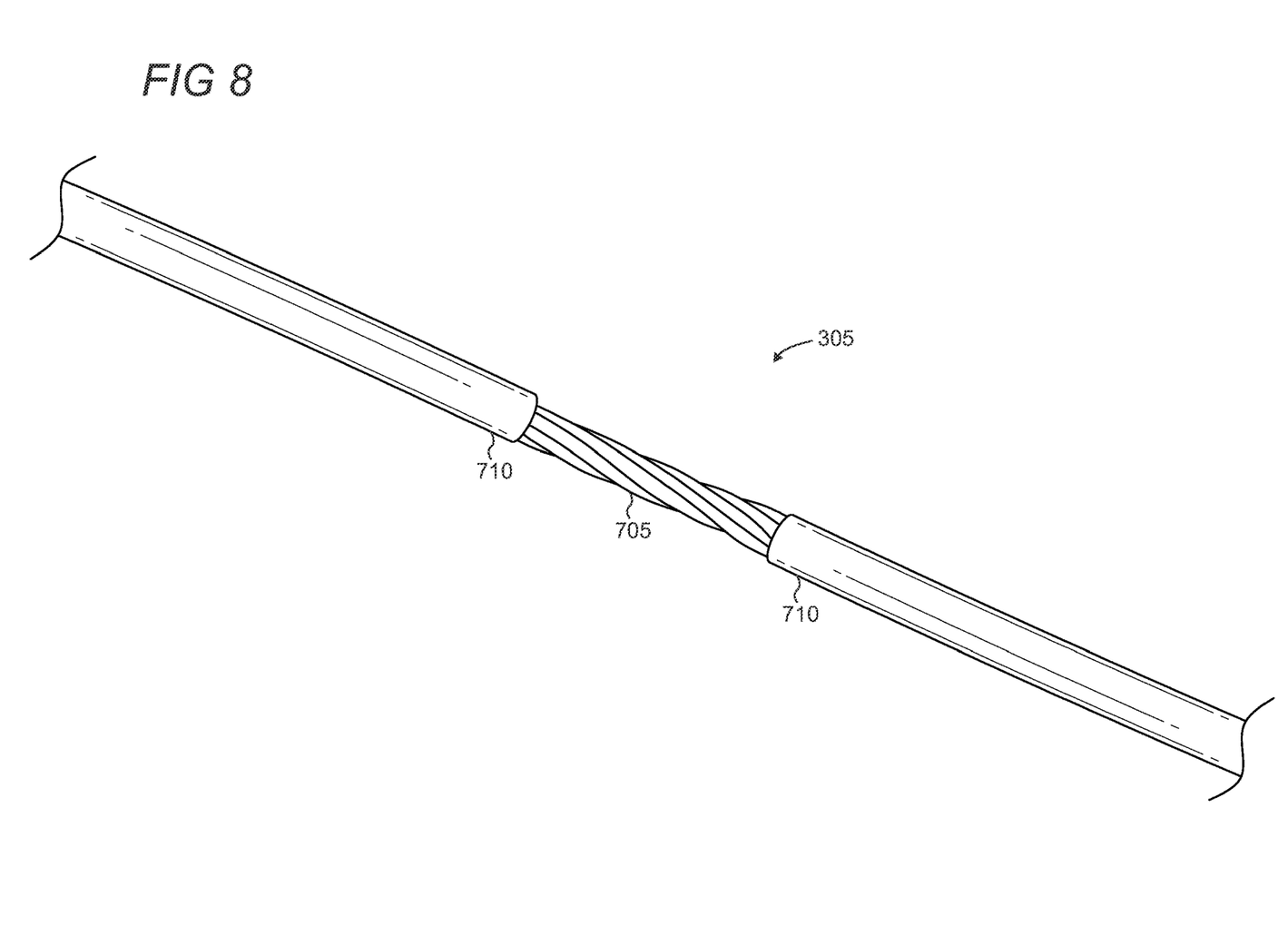
FIG. 8 shows an illustrative representation of the skinned wire after a partial removal.

As the stripper 110 rotates 360° about the wire 305, the stripper's spring-loaded blade 180 contacts and cuts the wire's skin 710. As a result, the wire's skin 710 peels away, and the wire's metal 705 in the center of the wire is exposed to enable a worker, such as a lineman operating on an electric wire on a telephone pole, to work on the wire. FIG. 7 shows an illustrative representation in which the wire's skin 710 is stripped away from the wire, and the wire's interior metal 705 is exposed. FIG. 8 shows an illustrative representation of the skinned wire when the skinner assembly's job is completed, and the skin or insulation 710 is removed from the metal wire.

Various exemplary embodiments are disclosed herein. In one exemplary embodiment, disclosed is a wire skinner, comprising: a stripper assembly, comprising: a worm gear; bearings positioned adjacent to the worm gear; a tube connected to the bearings, the tube having an opening; a hinge frame at least partially surrounding the tube, wherein the hinge frame opens and closes about a hinge; and a blade, wherein the blade at least partially overlaps with the tube's opening; a drive assembly, comprising: a base; a worm shaft positioned within the base, wherein the worm shaft engages with the worm gear to facilitate rotational movement of the worm gear; a closure connected to the base that opens and closes about a hinge; and a drive shaft extending outward from the base.

In another example, the base includes a cutout to receive the worm gear, and wherein the worm shaft is positioned within the cutout. As a further example, the closure also includes a cutout to accommodate the worm gear. In another example, the drive shaft is connected to the worm shaft such that rotational movement of the drive shaft translates to the worm shaft. As another example, a hinge pin where the hinge frame connects and about which the hinge frame rotates to open and close the stripper assembly. In a further example, a latch that engages with a latch pin on a side opposite the hinge pin which secures the stripper assembly in a closed position. As another example, the tube's opening extends fully from end-to-end on the stripper assembly. As another example, a blade holder to which the blade connects, and wherein the blade holder includes a spring to cause outward pressure against the blade. As another example, the worm gear is comprised of two distinct partial gears that engage with each other when the stripper assembly is in a closed position. In another example, the bearings also separate with the partial worm gears to enable the stripper assembly to open.

In another embodiment, implemented is a method of removing an exterior surface from a wire, comprising: providing a stripper assembly having a worm gear, bearings positioned adjacent to the worm gear, a tube connected to the bearings, and a hinge frame that at least partially surrounds the tube; opening the stripper assembly about a hinge, in which opening the stripper assembly exposes the tube's opening; positioning a wire within the tube's opening; closing the stripper assembly with the wire positioned inside the tube; and attaching a drive assembly over the stripper assembly's worm gear, wherein the drive assembly includes a base, closure, and worm shaft that engages with the worm gear.

In another example, a drive shaft connected to the worm shaft, and wherein rotational movement of the drive shaft translates to the worm shaft. In another example, the base includes a cutout to receive the worm gear, and wherein the worm shaft is positioned within the cutout. As another example, the closure also includes a cutout to accommodate the worm gear. In another example, a hinge pin where the hinge frame connects and about which the hinge frame rotates to open and close the stripper assembly. In another example a latch which engages with a latch pin on a side opposite the hinge pin which secures the stripper assembly in a closed position. In another example, the tube's opening extends fully from end-to-end on the stripper assembly. In another example, a blade holder to which the blade connects, and wherein the blade holder includes a spring to cause outward pressure against the blade. As another example, the worm gear is comprised of two distinct partial gears that engage with each other when the stripper assembly is in a closed position. As another example, the bearings also separate with the partial worm gears to enable the stripper assembly to open.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A powered wire skinner, comprising:
   a stripper assembly, comprising:
      a worm gear;
      bearings positioned adjacent to the worm gear;
      a tube connected to the bearings, the tube having an opening;
      a hinge frame at least partially surrounding the tube, wherein the hinge frame opens and closes about a hinge; and
      a blade, wherein the blade at least partially overlaps with the tube's opening;
   a drive assembly, comprising:
      a base;
      a worm shaft positioned within the base, wherein the worm shaft engages with the worm gear to facilitate rotational movement of the worm gear;
      a closure connected to the base that opens and closes about a hinge; and
      a drive shaft extending outward from the base.

2. The powered wire skinner of claim 1, wherein the base includes a cutout to receive the worm gear, and wherein the worm shaft is positioned within the cutout.

3. The powered wire skinner of claim 2, wherein the closure also includes a cutout to accommodate the worm gear.

4. The powered wire skinner of claim 1, wherein the drive shaft is connected to the worm shaft such that rotational movement of the drive shaft translates to the worm shaft.

5. The powered wire skinner of claim 1, further comprising a hinge pin where the hinge frame connects and about which the hinge frame rotates to open and close the stripper assembly.

6. The powered wire skinner of claim 5, further comprising a latch that engages with a latch pin on a side opposite the hinge pin which secures the stripper assembly in a closed position.

7. The powered wire skinner of claim 1, wherein the tube's opening extends fully from end-to-end on the stripper assembly.

8. The powered wire skinner of claim 1, further comprising a blade holder to which the blade connects, and wherein the blade holder includes a spring to cause outward pressure against the blade.

9. The powered wire skinner of claim 1, wherein the worm gear is comprised of two distinct partial gears that engage with each other when the stripper assembly is in a closed position.

10. The powered wire skinner of claim 9, wherein the bearings also separate with the two distinct partial gears to enable the stripper assembly to open.

11. A method of removing an exterior surface from a wire, comprising:
   providing a stripper assembly having a worm gear, bearings positioned adjacent to the worm gear, a tube connected to the bearings and having an opening and a hinge frame that at least partially surrounds the tube;
   opening the stripper assembly about a hinge, in which opening the stripper assembly exposes the tube's opening;
   positioning a wire within the tube's opening;
   closing the stripper assembly with the wire positioned inside the tube; and
   attaching a drive assembly over the worm gear, wherein the drive assembly includes a base, a closure, and a worm shaft that engages with the worm gear.

12. The method of claim 11, further comprising a drive shaft connected to the worm shaft, and wherein rotational movement of the drive shaft translates to the worm shaft.

13. The method of claim 11, wherein the base includes a cutout to receive the worm gear, and wherein the worm shaft is positioned within the cutout.

14. The method of claim 13, wherein the closure also includes a cutout to accommodate the worm gear.

15. The method of claim 11, further comprising a hinge pin where the hinge frame connects and about which the hinge frame rotates to open and close the stripper assembly.

16. The method of claim 15, further comprising a latch which engages with a latch pin on a side opposite the hinge pin which secures the stripper assembly in a closed position.

17. The method of claim 11, wherein the tube's opening extends fully from end-to-end on the stripper assembly.

18. The method of claim 11, further comprising a blade holder to which the blade connects, and wherein the blade holder includes a spring to cause outward pressure against the blade.

19. The method of claim 11, wherein the worm gear is comprised of two distinct partial gears that engage with each other when the stripper assembly is in a closed position.

20. The method of claim 19, wherein the bearings also separate with the partial two distinct gears to enable the stripper assembly to open.

\* \* \* \* \*